(12) United States Patent
Brenner et al.

(10) Patent No.: US 7,742,997 B1
(45) Date of Patent: Jun. 22, 2010

(54) SYSTEM AND METHOD FOR MANAGEMENT AND DELIVERY OF CONTENT AND RULES

(75) Inventors: Margaret S. Brenner, Hockessin, DE (US); Scott C. Proud, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1764 days.

(21) Appl. No.: 10/830,114

(22) Filed: Apr. 23, 2004

(51) Int. Cl.
*G06Q 10/00* (2006.01)
*G06Q 30/00* (2006.01)

(52) U.S. Cl. .................. 705/300; 705/14.72

(58) Field of Classification Search ........... 705/1
See application file for complete search history.

(56) References Cited

U.S. PATENT DOCUMENTS

| | | | |
|---|---|---|---|
| 3,938,091 A | 2/1976 | Atalla et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |
| 4,696,491 A | 9/1987 | Stenger |
| 4,713,761 A | 12/1987 | Sharpe et al. |
| 4,725,719 A | 2/1988 | Oncken et al. |
| 4,823,264 A | 4/1989 | Deming |
| 4,882,675 A | 11/1989 | Nichtberger et al. |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese et al. |
| 5,157,717 A | 10/1992 | Hitchcock |
| 5,220,501 A | 6/1993 | Lawlor et al. |
| 5,265,033 A | 11/1993 | Vajk et al. |
| 5,317,683 A | 5/1994 | Hager et al. |
| 5,321,841 A | 6/1994 | East et al. |
| 5,351,186 A | 9/1994 | Bullock et al. |
| 5,412,708 A | 5/1995 | Katz |
| 5,420,405 A | 5/1995 | Chasek |
| 5,424,938 A | 6/1995 | Wagner et al. |

(Continued)

OTHER PUBLICATIONS eCharge, eCharge Corporation, www.echarge.com, Dec. 3, 1999, 12 pages.

(Continued)

*Primary Examiner*—John G Weiss
*Assistant Examiner*—Candice D Carter
(74) *Attorney, Agent, or Firm*—Goodwin Procter LLP

(57) ABSTRACT

A system and methods for management and delivery of content and rules is disclosed. An exemplary method may comprise managing, for an organization, a plurality of data and a plurality of content in separate database entities, wherein the plurality of content is associated with the plurality of data based on a plurality of rules; packaging the plurality of rules with the plurality of content in a carrier that is independent from one or more presentation channels, wherein at least part of the plurality of content is integrated with at least part of the plurality of data; delivering the plurality of data and the carrier to the one or more presentation channels; integrating, at the one or more presentation channels, the plurality of data with the plurality of content based on the plurality of rules; and distributing the integrated data and content through the one or more presentation channels.

33 Claims, 5 Drawing Sheets

U.S. PATENT DOCUMENTS

| | | | |
|---|---|---|---|
| 5,446,740 A | 8/1995 | Yien et al. |
| 5,450,537 A | 9/1995 | Hirai et al. |
| 5,467,269 A | 11/1995 | Flaten |
| 5,473,143 A | 12/1995 | Vak et al. |
| 5,473,732 A | 12/1995 | Chang |
| 5,511,117 A | 4/1996 | Zazzera |
| 5,532,920 A | 7/1996 | Hartrick et al. |
| 5,537,314 A | 7/1996 | Kanter |
| 5,537,473 A | 7/1996 | Saward |
| 5,544,086 A | 8/1996 | Davis et al. |
| 5,557,518 A | 9/1996 | Rosen |
| 5,568,489 A | 10/1996 | Yien et al. |
| 5,570,465 A | 10/1996 | Tsakanikas |
| 5,590,197 A | 12/1996 | Chen et al. |
| 5,592,560 A | 1/1997 | Deaton et al. |
| 5,594,837 A | 1/1997 | Noyes |
| 5,598,557 A | 1/1997 | Doner et al. |
| 5,606,496 A | 2/1997 | D'Agostino |
| 5,621,789 A | 4/1997 | McCalmont et al. |
| 5,621,812 A | 4/1997 | Deaton et al. |
| 5,625,767 A | 4/1997 | Bartell et al. |
| 5,634,101 A | 5/1997 | Blau |
| 5,638,457 A | 6/1997 | Deaton et al. |
| 5,644,493 A | 7/1997 | Motai et al. |
| 5,652,786 A | 7/1997 | Rogers |
| 5,653,914 A | 8/1997 | Holmes et al. |
| 5,657,383 A | 8/1997 | Gerber et al. |
| 5,659,165 A | 8/1997 | Jennings et al. |
| 5,664,115 A | 9/1997 | Fraser |
| 5,675,662 A * | 10/1997 | Deaton et al. ............... 382/137 |
| 5,684,870 A | 11/1997 | Maloney et al. |
| 5,710,887 A | 1/1998 | Chelliah et al. |
| 5,710,889 A | 1/1998 | Clark et al. |
| 5,727,163 A | 3/1998 | Bezos |
| 5,734,838 A | 3/1998 | Robinson et al. |
| 5,740,231 A | 4/1998 | Cohn et al. |
| 5,754,840 A | 5/1998 | Rivette et al. |
| 5,758,328 A | 5/1998 | Giovannoli |
| 5,761,647 A | 6/1998 | Boushy |
| 5,761,661 A | 6/1998 | Coussens et al. |
| 5,774,122 A | 6/1998 | Kojima et al. |
| 5,778,178 A | 7/1998 | Arunachalam |
| 5,784,562 A | 7/1998 | Diener |
| 5,790,650 A | 8/1998 | Dunn et al. |
| 5,790,785 A | 8/1998 | Klug et al. |
| 5,793,861 A | 8/1998 | Haigh |
| 5,794,221 A | 8/1998 | Egendorf |
| 5,794,259 A | 8/1998 | Kikinis |
| 5,796,395 A | 8/1998 | de Hond |
| 5,802,498 A | 9/1998 | Comesanas |
| 5,802,502 A | 9/1998 | Gell et al. |
| 5,815,657 A | 9/1998 | Williams et al. |
| 5,815,683 A | 9/1998 | Vogler |
| 5,819,092 A | 10/1998 | Ferguson et al. |
| 5,819,285 A * | 10/1998 | Damico et al. ............ 707/104.1 |
| 5,826,241 A | 10/1998 | Stein et al. |
| 5,826,245 A | 10/1998 | Sandberg-Diment |
| 5,826,250 A | 10/1998 | Trefler |
| 5,828,734 A | 10/1998 | Katz |
| 5,832,476 A | 11/1998 | Tada et al. |
| 5,835,580 A | 11/1998 | Fraser |
| 5,838,906 A | 11/1998 | Doyle et al. |
| 5,842,178 A | 11/1998 | Giovannoli |
| 5,842,211 A | 11/1998 | Horadan et al. |
| 5,844,553 A | 12/1998 | Hao et al. |
| 5,845,259 A | 12/1998 | West et al. |
| 5,845,260 A | 12/1998 | Nakano et al. |
| 5,847,709 A | 12/1998 | Card et al. |
| 5,848,427 A | 12/1998 | Hyodo |
| 5,862,223 A | 1/1999 | Walker et al. |
| 5,870,456 A | 2/1999 | Rogers |
| 5,870,724 A | 2/1999 | Lawlor et al. |
| 5,873,072 A | 2/1999 | Kight et al. |
| 5,884,032 A | 3/1999 | Bateman et al. |
| 5,884,288 A | 3/1999 | Chang et al. |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader et al. |
| 5,914,472 A | 6/1999 | Foldare et al. |
| 5,915,244 A | 6/1999 | Jack et al. |
| 5,918,214 A | 6/1999 | Perkowski |
| 5,918,217 A | 6/1999 | Maggioncalda et al. |
| 5,918,239 A | 6/1999 | Allen et al. |
| 5,926,812 A | 7/1999 | Hilsenrath et al. |
| 5,933,816 A | 8/1999 | Zeanah et al. |
| 5,933,817 A | 8/1999 | Hucal |
| 5,933,823 A | 8/1999 | Cullen et al. |
| 5,933,827 A | 8/1999 | Cole et al. |
| 5,940,812 A | 8/1999 | Tengel et al. |
| 5,952,641 A | 9/1999 | Korshun |
| 5,953,710 A | 9/1999 | Fleming |
| 5,958,007 A | 9/1999 | Lee et al. |
| 5,960,411 A | 9/1999 | Hartman et al. |
| 5,963,925 A | 10/1999 | Kolling et al. |
| 5,963,953 A | 10/1999 | Cram et al. |
| 5,969,318 A | 10/1999 | Mackenthun |
| 5,970,478 A | 10/1999 | Walker et al. |
| 5,970,482 A | 10/1999 | Pham et al. |
| 5,982,370 A | 11/1999 | Kamper |
| 5,987,434 A | 11/1999 | Libman |
| 5,991,751 A | 11/1999 | Rivette et al. |
| 5,991,780 A | 11/1999 | Rivette et al. |
| 5,995,948 A | 11/1999 | Whitford et al. |
| 5,999,907 A | 12/1999 | Donner |
| 6,005,939 A | 12/1999 | Fortenberry et al. |
| 6,009,410 A * | 12/1999 | LeMole et al. ................ 705/14 |
| 6,012,088 A | 1/2000 | Li et al. |
| 6,014,636 A | 1/2000 | Reeder |
| 6,018,714 A | 1/2000 | Risen, Jr. et al. |
| 6,026,429 A | 2/2000 | Jones et al. |
| 6,032,147 A | 2/2000 | Williams et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,076,072 A | 6/2000 | Libman |
| 6,081,810 A | 6/2000 | Rosenzweig et al. |
| 6,088,683 A | 7/2000 | Jalili |
| 6,088,700 A | 7/2000 | Larsen et al. |
| 6,098,070 A | 8/2000 | Maxwell |
| 6,112,181 A | 8/2000 | Shear et al. |
| 6,131,810 A | 10/2000 | Weiss et al. |
| 6,134,549 A | 10/2000 | Regnier et al. |
| 6,144,948 A | 11/2000 | Walker et al. |
| 6,148,293 A | 11/2000 | King |
| 6,170,011 B1 | 1/2001 | Macleod Beck et al. |
| 6,182,060 B1 * | 1/2001 | Hedgcock et al. ............... 707/1 |
| 6,185,242 B1 | 2/2001 | Arthur et al. |
| 6,189,029 B1 | 2/2001 | Fuerst |
| 6,195,644 B1 | 2/2001 | Bowie |
| 6,201,948 B1 | 3/2001 | Cook et al. |
| 6,202,005 B1 | 3/2001 | Mahaffey |
| 6,202,054 B1 | 3/2001 | Lawlor et al. |
| 6,298,356 B1 | 10/2001 | Jawahar et al. |
| 6,349,242 B2 | 2/2002 | Mahaffey |
| 6,438,594 B1 | 8/2002 | Bowman-Amuah |
| 6,493,677 B1 | 12/2002 | von Rosen et al. |
| 6,623,415 B2 | 9/2003 | Gates et al. |
| 2001/0012974 A1 | 8/2001 | Mahaffey |
| 2002/0095481 A1* | 7/2002 | George et al. ............... 709/219 |
| 2003/0084647 A1 | 5/2003 | Smith et al. |
| 2003/0088552 A1 | 5/2003 | Bennett et al. |

| | | |
|---|---|---|
| 2003/0115160 A1 | 6/2003 | Nowlin et al. |
| 2003/0119642 A1 | 6/2003 | Gates et al. |
| 2003/0177067 A1 | 9/2003 | Cowell et al. |
| 2005/0010472 A1* | 1/2005 | Quatse et al. .................. 705/14 |

OTHER PUBLICATIONS

Tracy Pletz et al., Summary of the at your risk architecture, Jun. 3, 1999, 8 pages.
Siebel, Siebel: Ensuring Customer Success, www.siebel.com, Nov. 17, 1999, 29 pages.
OMG, Welcome to OMG's CORBA for Beginners Page!, www.omg.com, May 25, 1999, 4 pages.
Sun MicroSystems, Inc., Schema for Representing CORBA Objects in an LDAP directory, May 21, 1999, 9 pages.
OMG, Library, www.omg.com, May 25, 1999, 5 pages.
OMG, What is CORBA?, , www.omg.com, May 25, 1999, 2 pages.
Overview of CORBA, , www.omg.com, May 25, 1999, 4 pages.
JAVA, JAVA™ Technology in the Real World, java.sun.com, May 21, 1999, 7 pages.
JAVA, JAVA™ Servlet API, java.sun.com, May 21, 1999, 5 pages.
JAVA, Staying in Touch with JNDI, java.sun.com, May 21, 1999, 8 pages.
JAVA, JAVA™ Remote Method Invocation (RMI) Interface, java.sun.com, May 21, 1999, 16 pages.
JAVA, Banking on JAVA™ Technology, java.sun.com, May 21, 1999, 7 pages.
JAVA, The JDBC™ Data Access API, java.sun.com, May 21, 1999, 3 pages.
Anne Thomas, Enterprise JAVABEANS™ Technology: Server Component Model for the Java™ platform, java.sun.com, May 21, 1999, 30 pages.
S. R. Hiremath, Numerical Credit Scoring Model, Operations Research Bulletin, WA13.16, Apr. 30, 1975, 2 pages.
Reuters, Getting Smart with Java: Sun Micro Says American Express to Use Java for Smart Card, www.abcnew.go.com/sciences/tech, Jun. 6, 2000, 2 pages.
David Bank, Cash, Check, Charge—What's Next?, Seattle Times, Mar. 6, 1998, 4 pages.
Gerry Vandenengel, Cards on the Internet: Advertising on a $3 Bill, Industry Intelligence, Feb. 1, 1995, 3 pages.
Kim A. Strassel, Dutch Software Concern Experiments with Electronic 'Cash' in Cyberspace, Wall Street Journal, Apr. 17, 1995, 1 page.
Jeffrey Kutler, Cash Card Creator Looking Beyond Mondex, Feb. 9, 1995, 1 page.
David Post, E-Cash: Can't Live With It, Can't Live Without It, The American Lawyer, pp. 116-117, Mar. 1, 1996.
Russell Mitchell, Cyberspace: Crafting software that will let you build a business out there, Business Week, pp. 78-86, Feb. 27, 1995.
Jeffrey Kutler, A Different Drummer on the Data Highway, American Banker, May 12, 1995, 2 pages.
Stephen Eppmt, A Player Goes After Big Bucks in Cyberspace, American Banker, May 5, 1995, 1 page.
Robert Barnham, Network Brings Together Producers and Companies, Bests Review Feb. 1, 1994, 1 page.
Vanessa Houlder, OFT Gives the Individual Top Priority: Report Calls for Deregulation of Business Lending, The Financial Times, Jun. 8, 1994, 1 page.
Kennedy Maiz, Fannie Mae on the Web, Newsbyte, May 8, 1995, 1 page.
Anne Knowles, Improved Internet Security Enabling On-Line Commerce, PC Week, Mar. 20, 1995, 4 pages.
Aversion Therapy: Banks Overcoming Fear of the Net to Develop Safe Internet-based Payment System w/ Netscape Communicator, Network World, Dec. 12, 1994, 1 page.
Don Clark, Microsoft, Visa to Jointly Develop PC Electronic-Shopping Software, Wall Street Journal, The, B9, Nov. 9, 1994, 3 pages.
Understanding Product Data Management, Hewlett-Packard Company, Apr. 26, 1999, 9 pages.
Getting Started: Specific GE TPN Post Service Use Guidelines, GE, Apr. 26, 1999, 18 pages.
Resource Center: Consolidated Edison Selects GE TPN Post, GE, Apr. 26, 1999, 9 pages.
ThomasNet, Thomas Publishing Company, Apr. 26, 1999, 9 pages.
SoluSource: For Engineers by Engineers, Thomas Publishing Company, Apr. 26, 1999, 10 pages.
Harris InfoSource, Apr. 26, 1999, 12 pages.
Welcome to MUSE, MUSE Technologies, Apr. 26, 1999, 28 pages.
Product Data Integration Technologies, Inc., PDIT, Apr. 26, 1999, 19 pages.
SBA: Pro-Net, SBA, Apr. 1, 1999, 11 pages.
FreeMarkets, FreeMarkets Online, Inc., Apr. 26, 1999, 35 pages.
Associates National Bank (DE) Credit Card Services, The Associates, www.theassocitheassociates.atescomcorn/consumer/credit_cards/main.html, Apr. 6, 1999, 6 pages.
At Your Request, Wingspanbankcom, Sep. 28, 1999, 1 page.
Robyn Meredith, Internet bank moves closer to virtual reality, USA Today, May 5, 1995, 1 page.
Marvin Sirbu and J.D. Tygar, NetBill: An Internet Commerce System Optimized for Network Delivered Services, http://www.ini.cmu.edu:80/netbill, pp. 1-12, Feb. 27, 1995, 12 pages.
The check is in the email., Information Today, vol. 12, No. 3, Mar. 1, 1995, ISSN: 8755-6286, 4 pages.
The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p4241047, 3 pages.
Richard Mitchell, Netlink Goes After an Unbanked Niche, wysiwyg://0/http://www.dialogclassic.com/history, ISSN: 1093-1279, Sep. 1999, 4 pages.
CORBA Overview, May 25, 1999, 14 pages.
The Source for JAVA Technology, Applets, May 21, 1999, 2 pages.
Jonathan Berry et al., Cover Story, A Potent New Tool For Selling Database, Business Week, Sep. 5, 1994, pp. 56-62.

* cited by examiner

FIG. 4

CONTENT ELEMENTS 402

SH_OA_LP_06080910

Late Payment APR: Late once during introductory period: [F]% [H]% on purchases. Late twice in any six-month period: [P]% [N] on all balances.

VRI F NBT FCAV 10

The Cash advance APR varies monthly. It equals the Prime Rate* plus VV% for cash advances, but not less than 86%.

COMPILED CONTENT 408

RATE, FEE AND OTHER COST INFORMATION

| | |
|---|---|
| Annual Percentage Rate (APR) for purchases (purchases include balance transfers) | A 0% fixed APR until the first day of the billing cycle that includes 5/01/03. After that, 9.9% fixed.* |
| Other APRs | Cash Advance APR: 19.99% variable<br>Late Payment APR: Late once during introductory period: [F]% fixed on purchases. Late twice in any six-month period: [P]% fixed on all balances. |
| Variable rate information | The cash advance APR varies monthly. It equals the Prime Rate* plus 15.24% for cash advances, but not less than 86%. |
| Grace period for repayment of purchase balances | At least 20 days, but none for balance transfers or convenience checks. |
| Method of computing the balance for purchases | Two-cycle average daily balance method (including new purchases) |
| Annual fee | None |
| Minimum finance charge | $1.00 |
| Transaction fee for certain purchases | Purchase of wire transfers or money orders; purchase of foreign currency and travelers checks from other than a bank; and use of convenience checks: 3% of the amount of each purchase or check, but not less than $5.00 nor more than $50.00. |

LOGIC/Rules 406

Schumer Box:

Box 1 (folder: 01_Annual_Percentage_Rate_APR):
    SH_APR_xxx_X_xxxx_xxxx

Box 2 (folder: 02_Other_APRs_OA):
  a_Balance Transfer_BT    SH_OA_BT_xxx_xxxx_xxx_xx
  b_Cash_Advance_CA    SH_OA_CA_xxx_xxxx_xxx
  c_Late_Payment_LP    SH_OA_LP_xxxxxxx_xxx_xx
  d_Overdraft_Protection_OOP    SH_OA_OOP_X_xxx Box 3 (folder: 03_Variable_Rate_Info_VRI):
    VRI_xx_xxx_xxxx_xx_xxx_xxxx

DATA SOURCE 404

| | |
|---|---|
| E_Intro Term/Up Date | 5/1/2003 |
| F_Go To APR% | 9.90 |
| G_Go to Daily Rate | 0.0271 |
| H_Go To Fixed/Var | F |
| I_Cash Advance APR% | 19.99 |
| J_Cash Advance Daily Rate | 0.1648 |
| K_Cash Advance Fixed / Variable | V |
| L_Determination Date | 22nd Day of Month |
| M_Example Date | None |
| N_Index % | None |
| O_Index Prime_A.00% | Prime |
| P_PP 2.30 APR% | 19.99 |
| Q_PP 2.30 Daily Rate% | 0.0548 |
| R_PP 2.30 APR% Fixed/Variable | F |
| S_PP 1.50 APR% | None |
| T_PP 1.50 Daily Rate% | None |
| U_PP 1.50 APR% Fixed/Variable | None |
| V_Go To Margin% | None |
| W_Cash Advance Margin % | 15.24 |
| X_PP 2.30 Margin% | None |
| Y_PP 1.50 Margin% | None |
| Z_Go To Min APR% (floor) | None |
| AA_Go To Minimum Daily% (floor) | None |
| BB_Cash Advance Maximum APR% (floor) | 19.49 |
| CC_Cash Advance Minimum Daily% (floor) | 0.1624 |
| DD_PP 2.30 Minimum APR% (floor) | None |

SYSTEM AND METHOD FOR MANAGEMENT AND DELIVERY OF CONTENT AND RULES

FIELD OF THE INVENTION

The present invention relates generally to business communication and marketing. More particular, the present invention relates to a system and method for management and delivery of content and rules.

BACKGROUND OF THE INVENTION

Nowadays, it is typical for a business organization to communicate with clients and the general public through a number of media channels in order to promote sales or to improve public relations. For example, a company may maintain a website to provide information related to corporate background, products and services, sales and promotions, etc. The company may interact directly with current or potential clients through its retail and customer services divisions. It may also contact current or potential clients through direct mailing or telemarketing. In addition, it may place advertisements via mass media such as newspapers, magazines, or radio and television broadcast. It may also display messages and/or advertisements on display-boards in public places or at public events.

Depending on specific topics, the targeted audience and carrier channels, these communications often vary substantially in their content, format and level of detail. For example, mass media advertisements and/or messages include general communications targeted at a large group of consumers. Due to the high costs of mass media channels, the language and format for these communications are typically short and concise. Direct mailings usually include specific offers tailored for individuals or families. This type of communication tends to be more personalized and more detailed. Interactive media such as Internet websites favor yet another style of communications, which can be both generalized and individualized if necessary. For example, on the one hand a website can provide general information regarding the company and its products and services to a visitor. On the other hand, the website may also need to generate personalized content through an interaction with the visitor. In addition, an Internet website may enjoy a number of electronic publishing abilities, such as animations and pop-out banners, not available to other media channels.

With the great variety of media channels available, a modern organization can be empowered to strengthen its relationship with existing clients, to extend its reach to potential clients, and to enhance its public image and public relations, provided that communications through the multiple channels are properly managed and coordinated.

However, existing business communications and marketing solutions generally do not meet such requirements. Many solutions are typically single-functioned in that they each only deal with one or two media channels at a time. For example, some targeted marketing processes are capable of inserting variable information into client communications which are only in printed format. These processes usually cannot be easily modified to accommodate a different set of data or content or support publishing through other media channels (e.g., Internet banners). As a result, they cannot readily respond to fast-changing business demands with effective coordination. In many organizations, variable content for one media channel are managed separately from those for another channel, where the redundant development and maintenance may lead to waste of resources and inconsistencies among the different channels. Those inconsistencies may cause customer dissatisfaction and even raise legal or compliance issues. Further, most existing content management implementations typically lack the ability to share content and data assets among different lines of business due to the complexity of decisioning process flows to multiple presentation channels. Most content management tools lack the ability to pass decisioning functionality to the presentation layers. Few of them facilitate efficient change management or reliable direct auditing.

For example, in a traditional direct mail process, in order to generate the required direct mail pieces for a marketing campaign, the business has to create a massive target list by sorting a population database and tagging selected entries with cell codes. The target list file is then delivered to a print vendor together with pre-composed layout files. The print vendor typically has to re-key or import layout files into their systems using placeholders for variable data that will be input from the list file. Based on the logic and business rules which are usually provided by the business in the form of written instructions, the print vendor will have to program variability instructions to match the variable data to the layout files. The print vendor also has to re-create the formatting information based on instructions and samples provided. Next, the list file is loaded into a computer system where the cell codes of the variable data are matched to the printed forms by executing the variability instructions. Samples of the printouts will be manually verified by the business before mass printing is allowed to proceed. For another cycle of direct mailing, much of the work will have to be re-created or repeated. As can be seen, the whole process is far from streamlined and there is plenty of room for errors to be introduced.

In a traditional web content management process the content is managed directly in the tool that is deploying the content on the web. If that content is used elsewhere in the business, it must usually be updated in multiple locations. Additionally, web deployments, too, lack the ability to pass or receive the decisioning rules.

Other problems and drawbacks also exist.

In view of the foregoing, it would desirable to provide a solution for managing and delivering enterprise content which overcomes the above-described deficiencies and shortcomings.

SUMMARY OF THE INVENTION

One embodiment of the present invention comprises a method for management and delivery of content and rules. The method comprises managing, for an organization, a plurality of data and a plurality of content in separate database entities, wherein the plurality of content is associated with the plurality of data based on a plurality of rules; packaging the plurality of rules with the plurality of content in a carrier that is independent from one or more presentation channels, wherein at least part of the plurality of content is integrated with at least part of the plurality of data; delivering the plurality of data and the carrier to the one or more presentation channels; integrating, at the one or more presentation channels, the plurality of data with the plurality of content based on the plurality of rules; and distributing the integrated data and content through the one or more presentation channels.

Another embodiment of the present invention comprises a system for management and delivery of content and rules. The system comprises at least one first database entity that manages a plurality of data; at least one second database entity that manages a plurality of content, wherein the plurality of content is associated with the plurality of data based on a plurality of rules; a processor module; a delivery module; and one or more presentation channels; where the processor module packages the plurality of rules with the plurality of content in a carrier that is independent from the one or more presentation channels, wherein at least part of the plurality of content is integrated with at least part of the plurality of data, the delivery module delivers the plurality of data and the carrier to the one or more presentation channels, and the one or more presentation channels integrate the plurality of data with the plurality of content based on the plurality of rules, and distribute the integrated data and content.

Yet another embodiment of the present invention comprises a system for management and delivery of content and rules. The system comprises means for managing, for an organization, a plurality of data and a plurality of content in separate database entities, wherein the plurality of content is associated with the plurality of data based on a plurality of rules; means for packaging the plurality of rules with the plurality of content in a carrier that is independent from one or more presentation channels, wherein at least part of the plurality of content is integrated with at least part of the plurality of data; means for delivering the plurality of data and the carrier to the one or more presentation channels; means for integrating, at the one or more presentation channels, the plurality of data with the plurality of content based on the plurality of rules; and means for distributing the integrated data and content through the one or more presentation channels.

Still another embodiment of the present invention comprises a computer readable medium having code for causing at least one processor to manage and deliver content and rules. The computer readable medium comprises code adapted to manage, for an organization, a plurality of data and a plurality of content in separate database entities, wherein the plurality of content is associated with the plurality of data based on a plurality of rules; code adapted to package the plurality of rules with the plurality of content in a carrier that is independent from one or more presentation channels, wherein at least part of the plurality of content is integrated with at least part of the plurality of data; code adapted to deliver the plurality of data and the carrier to the one or more presentation channels; code adapted to integrate, at the one or more presentation channels, the plurality of data with the plurality of content based on the plurality of rules; and code adapted to distribute the integrated data and content through the one or more presentation channels.

One further embodiment of the present invention comprises a method for management and delivery of content and rules. The method comprises managing, for an organization, a plurality of data and a plurality of content in separate database entities, wherein the plurality of data are associated with a plurality of products and a plurality of clients, the plurality of content is stored in at least one media-independent format and comprises at least one of a discrete text element, a compiled text element and a graphic element, and the plurality of content is associated with the plurality of data based on a plurality of rules; packaging the plurality of rules with the plurality of content in a carrier that is independent from one or more presentation channels, wherein at least part of the plurality of content is integrated with at least part of the plurality of data, the plurality of content is packaged based on an extensible markup language (XML), and the plurality of rules are packaged based on an XSL transformations (XSLT) language; delivering the plurality of data and the carrier to the one or more presentation channels, wherein the one or more presentation channels comprise at least one of an Internet website, a printed communication, an electronic communication, a printed advertisement, a broadcast advertisement, a telemarketing script, an interactive voice response unit message, an automatic teller machine (ATM) message, and a display-board message; integrating, at the one or more presentation channels, the plurality of data with the plurality of content based on the plurality of rules and specific needs of the one or more presentation channels; and distributing the integrated data and content through the one or more presentation channels.

Additional features and advantages of the invention will be set forth in the description that follows, and in part will be apparent from the description, or may be learned by practice of the invention. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 4 is a block diagram illustrating an exemplary method for content-data pre-integration according to an embodiment of the present invention;

DETAILED DESCRIPTION OF THE INVENTION

Reference will now be made in detail to the present embodiments of the invention, examples of which are illustrated in the accompanying drawings.

Figure 1:
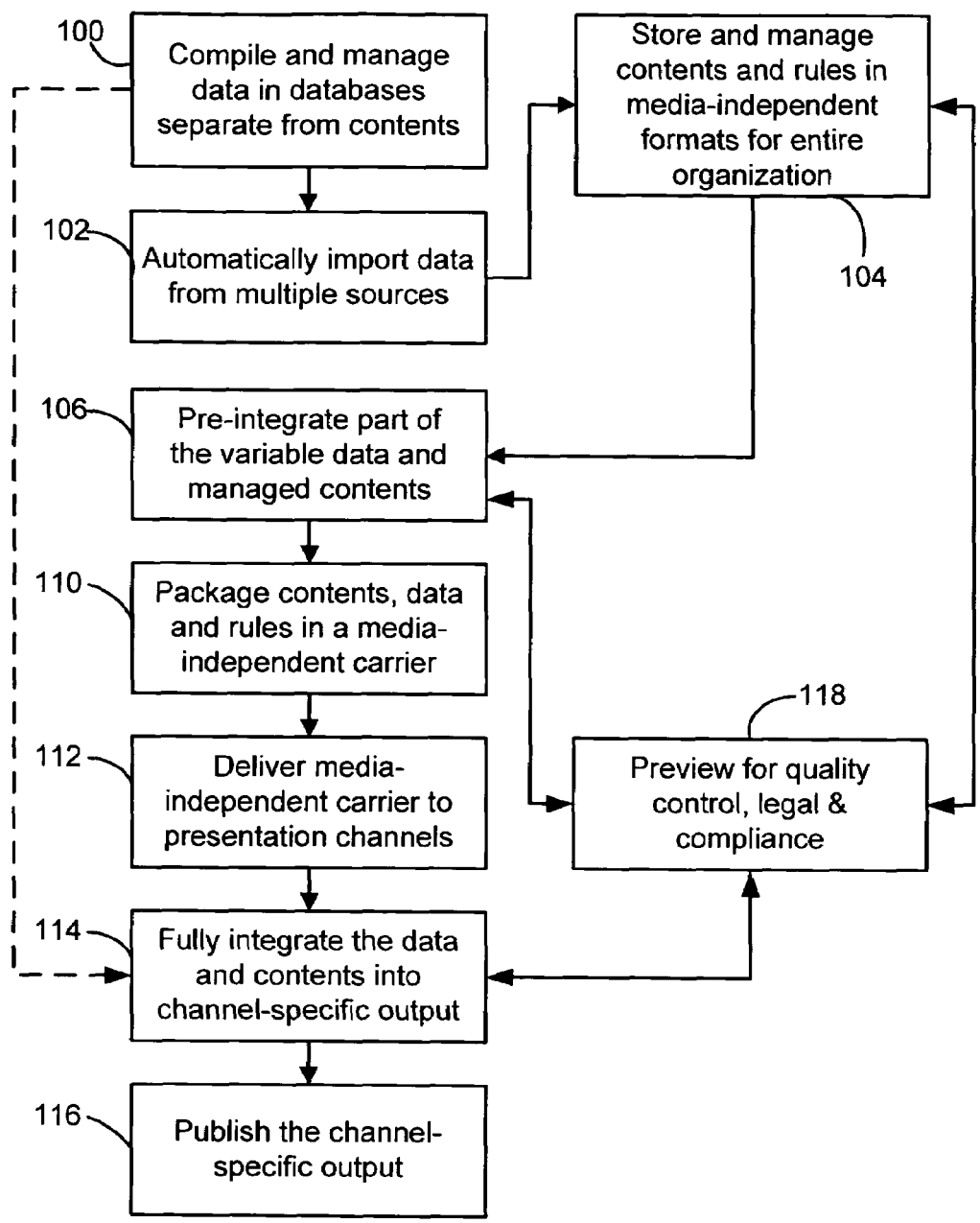
FIG. 1 is a flow chart illustrating an exemplary method for management and delivery of content and rules according to an embodiment of the present invention.

Referring to FIG. 1, there is shown a flow chart illustrating an exemplary method for management and delivery of content and rules according to an embodiment of the present invention. The process steps in this flow chart provide an overview of the inventive method.

In step 100, a plurality of data for an organization may be compiled and managed in one or more databases that are separate from managed content. The data may be from a number of sources providing a wide range of information. For example, a customer database may contain not only basic identification and contact information regarding each customer, but also such information as the account status, account history and spending patterns, etc. A marketing database may contain product or service offers including prices, interest rates, and other specific terms. Other databases may contain financial market rates, indexes and benchmarks, local and federal regulations, etc.

In step 102, relevant data may be automatically imported from the various sources. A core content management system or application may have access to the various databases over network interface(s), direct data junction or portable media, for example.

Concurrently, in step 104, a plurality of content and rules may be stored and managed in one or more media-independent formats for an entire organization. The managed content may include any kind of text or graphic elements that may be used in the organization's communications with clients, partners and/or the general public. For example, for a financial company, text elements may include disclosure language, portfolio language, fulfillment language, acquisition languages and partner languages. These text elements may be either discrete (e.g., words or phrases) or compiled (e.g., sentences or paragraphs). The graphic elements may include, for example, company logos, trademarks, letterheads, photos, creative images, forms and templates, etc. The content may be managed in a centralized fashion for the entire organization such that there is no duplicate of content storage and maintenance. The managed content may be stored in one or a series of relational databases. Updates and modifications of the content may be done through a user interface and the resulting changes can be kept consistent throughout the organization. The managed content is typically standardized. For each element that varies in final presentation, the similarities are recognized and retained in a standardized form while the dissimilarities are treated as variables or variable content. According to embodiments of the invention, the formats of the content may be independent from the media types in which it will be presented. One or more style tags or identifiers may be attached to each content unit.

Furthermore, a plurality of logic and business rules may be compiled and managed for the entire organization. Such rules may include mandatory, conditional or optional associations between the variable data and managed content and/or among the data or content themselves. These rules typically govern the logical combination as well as physical layout of the data and content. The compilation and management of the rules may be based on organization policies, business motivations, regulatory or legal requirements, and contractual obligations. For example, the business rules may reflect particular promotional offers, qualification algorithms, terms and conditions, etc. The rules may also include those concerning the fonts, formats and styles of a presentation output.

Part of the data and managed content may be pre-integrated in step 106 based on the plurality of logic and business rules. For example, the data and content that do not vary based on the media, presentation channels or target audience may be combined and composed in accordance with the predetermined rules. The pre-integrated elements may themselves serve as part of the managed content in the subsequent processes.

In step 110, the relevant content, integrated data and rules may be packaged in a media-independent carrier. A separate data file containing account-specific information may have been sorted and organized into a list file. The managed content may be selected and have style tags embedded in the presentation nodes of the content file attached thereto. According to an embodiment of the invention, the managed content may be packaged based on an extensible markup language (XML). The relevant rules governing the integration of the variable data and managed content may be packaged based on an XSL transformations (XSLT) language. XSL is short for extensible stylesheet language. The media-independent carrier may be an electronic package containing the list file, the XML file and the XSLT file. Alternatively, the list file may be delivered separately to the presentation channels.

In step 112, the media-independent carrier may be delivered to one or more presentation channels. A presentation channel is typically a media channel through which the organization may communicate with a target or general audience. Exemplary presentation channels may include direct mailing, printed advertisements, Internet websites, display boards, televised commercials, telemarketing scripts, E-mails, alerts, interactive voice response unit (IVR or VRU) messages, and web pages, etc. Delivery of the carrier may be carried out over a network connection or via portable media.

In step 114, each presentation channel may fully integrate the data and content into channel-specific output based on the relevant rules and the specific needs of each channel. According to embodiments of the invention, it would be desirable for each presentation channel to be equipped with processing tools capable of handling the media-independent carrier. Such processing tools may import the electronic package, unpack the data, content and rules files, populate the content with variable data based on the rules as well as specific needs of the presentation channel, and generate outputs suitable for publishing in the channel.

In step 116, the channel-specific output may be published. That is, the outputs with integrated data and content may finally be presented to the intended audience through the specific media channels. For example, personalized letters, coupons or convenience checks may be mailed to the individuals; the composed web content may be called to a web server and dynamically published based on customer information; the advertisements may be printed on magazines or newspapers; commercial scripts may be broadcast on radio or television; and telemarketing scripts may be read by telemarketers to their callers.

The above-described process may also include a preview and auditing step 118 where the managed content, the pre-integrated data and content, and the fully integrated outputs may be previewed and audited for quality control as well as legal and compliance requirements. The auditing may be carried out by financial experts, administrative personnel, legal experts and IT staff through a high-level user interface. Changes may be made through a change management interface.

Figure 2:
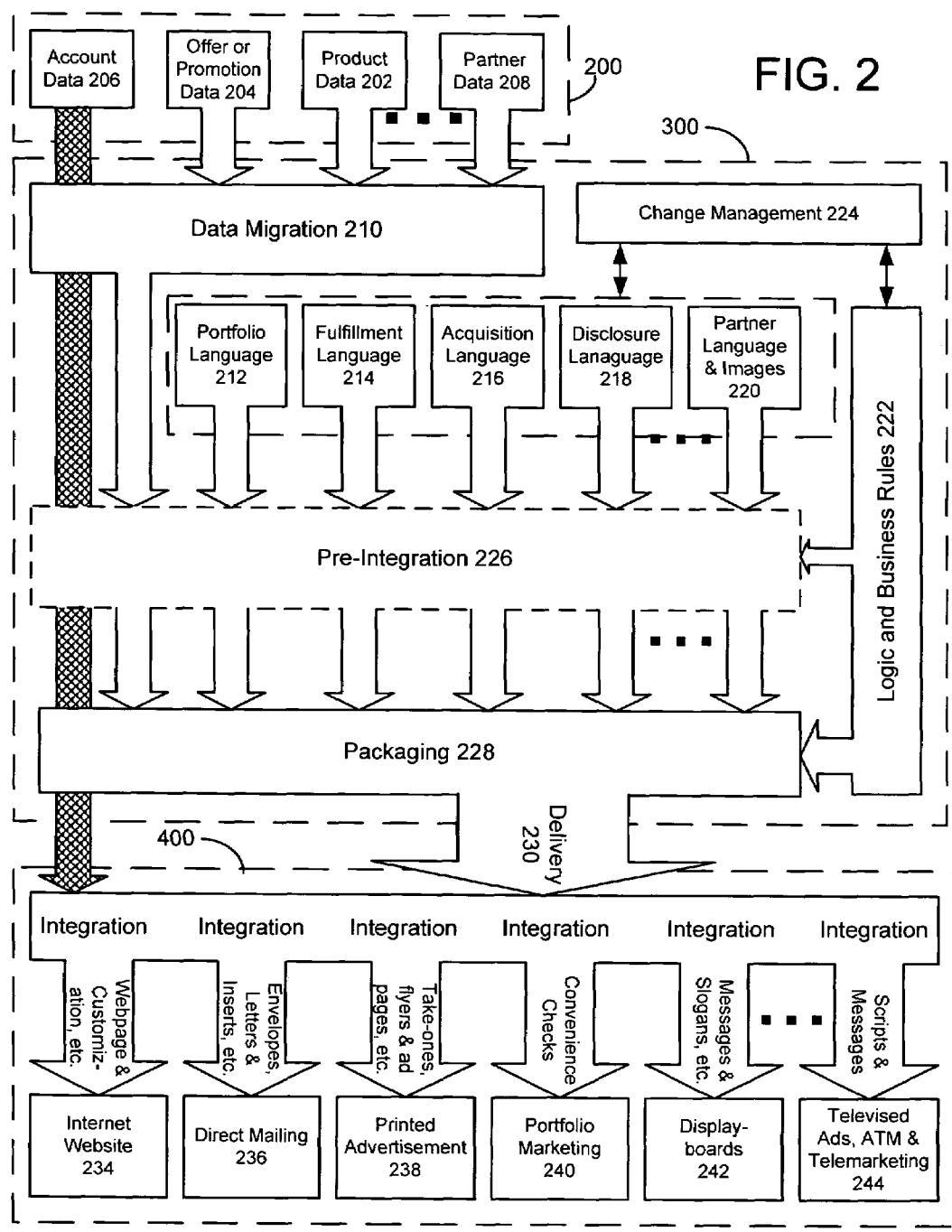
FIG. 2 is a block diagram illustrating exemplary data flows and functional modules according to an embodiment of the present invention.

FIG. 2 is a block diagram illustrating exemplary data flows and functional modules according to an embodiment of the present invention. The exemplary data flows and functional modules may be implemented based on the exemplary system depicted in FIG. 3. The architecture of the content management system involve three layers: data (200), managed content (300) and presentation (400), which are developed and managed separately in order to best support the complexity and scope of the business. In practice, data from various sources, such as products data 202, offer or promotion data 204, and partner data 208, may be automatically imported to the content layer 300. Specifically, the data may be delivered through a data migration interface 210. The core content management application(s) may automatically pull appropriate content elements, such as portfolio language 212, fulfillment language 214, acquisition language 216, disclosure language 218 and partner language & images 220. Based on the logic and business rules 222, the content may be populated with variable data points and aggregated content elements may be created in pre-integration 226. The data, content and rules may then be packaged (228) and delivered (230) to presentation layer 400. The account data 206 may be delivered directly to the presentation layer 400 or pass through the content layer 300. The content layer 300 may also include a change management module 224 for modifying and updating the content and rules through a user-friendly interface. The presentation layer 400 may include a number of presentation channels, such as internet website 234, direct mailing 236, printed advertisement 238, portfolio marketing 240, display boards 242, and televised ads, ATM & telemarketing 244. Each of these channels may fully integrate the data and content based on the rules received and their individual needs. Each channel may generate outputs specifically suited to their communication medium. For example, in the Internet website channel 234, the output may include general informational web pages, as well as customized web messages for individual online members. In the direct mailing channel 236, the output may include personalized envelopes, letters and inserts that represent offer information matched to qualified individuals. In the printed advertisement channel 238, the output may include take-ones, flyers and advertisement pages with information or messages of a general nature. In channel 244, the output may include certain scripts to be incorporated in television commercials, messages to be displayed at automatic teller machines (ATMs), telemarketing scripts, and/or interactive voice response unit (IVR or VRU) messages.

Figure 3:
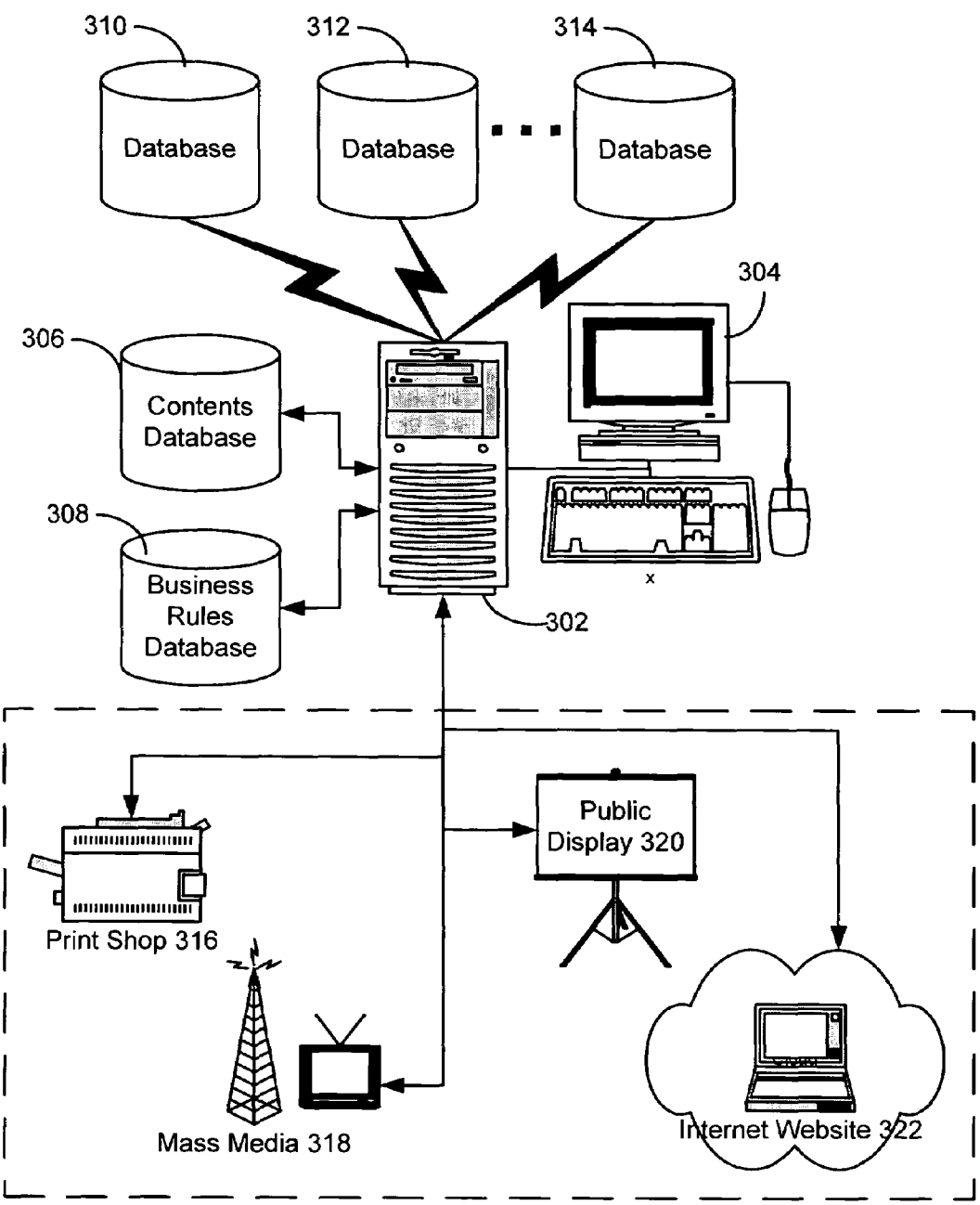
FIG. 3 is a block diagram illustrating an exemplary system for management and delivery of content and rules according to an embodiment of the present invention.

FIG. 3 is a block diagram illustrating an exemplary system for management and delivery of content and rules according to an embodiment of the present invention. In FIG. 3, there is shown a processor 302, a user Interface 304, a content database 306, a business rules database 308, other databases 310, 312 and 314, and exemplary presentations channels such as print shop 316, mass media 318, public display 320, and Internet website 322. Processor 302 may be a computer or a server capable of data manipulation, logic operation and mathematical calculation. Processor 302 may also have network access or other data connections with other components of the system. User interface 304 may include input and output devices as well as software interfaces to enable a user to interact with the content management application(s) hosted in processor 302. Content database 306 may comprise storage medium as well as management tools for a variety of content. Business rules database 308 may comprise storage medium as well as management tools for logic and business rules. The databases 310, 312 and 314 represent various sources of variable data that may be accessed locally or remotely.

In operation, processor 302 may be commanded through user interface 304 to manage content database 306 and business rules database 308. Processor 302 may also be commanded to import relevant data from databases 310, 312 and 314, associate the data with managed content in content database 306 based on the rules in database 308, and package the data, content and rules for delivery to the presentation channels.

FIG. 4 is a block diagram illustrating an exemplary method for content-data pre-integration according to an embodiment of the present invention. In FIG. 4, there is shown content elements 402, data source 404, logic/rules 406 and compiled content 408. The exemplary data, content and rules are related to a standard Schumer Box that financial companies are required to use to discloses the basic terms of a credit card in credit card advertising and solicitation materials. Herein, the Content Elements 402 include the specific language for the "Other APR" field and "Variable rate information" field. In a content database, the language for the "Other APR" field is identified with a field code "SH_OA_LP__06080910" and language for the "Variable rate information" field is identified with field code "VRI F NBT FCAV 10." Take the "Late Payment APR" language as an example. The language includes variable portions identified by place holding tags such as [F], [H] and [P], which have their corresponding data values in data source 404. To compile a "RATE, FEE AND OTHER COST INFORMATION" table, the Schumer Box part of the logic/rules 406 may be executed by the content management system. For example, to populate the "Late Payment APR" portion in the "Other APR" field, the field code "SH_OA_LP_XXXXXXXX" in the rule table may be utilized to identify the appropriate content element, which is "Late Payment APR: Late once during introductory period: [F]% [H] on purchases. Late twice in any six-month period: [P]% [R] on all balances."

And the place holding tags [F], [H], [P] and [R] in the selected content element may be utilized to pull the relevant data values 9.90, F, 19.99 and F respectively, from the data source list file. The data values may be combined with the "Late Payment APR" language and filled in the appropriate field in the Schumer Box, so that port may read "Late Payment APR: Late once during introductory period: 9.90% fixed on purchases. Late twice in any six-month period: 19.99% fixed on all balances."

in the final compiled content 408. This Schumer Box (compiled content 408) is now pre-integrated content which may be combined with other pre-integrated content, such as marketing language, and sent to the presentation channels with the rules and list file or other customer data to be used to create a single presentation package populated with the customer's account level information such as name, address, balance. The Schumer Box content may be published via a variety of presentation channels, for example printed in credit card advertisements, inserted in mailing pieces, uploaded to web pages, shown on public display boards or read in a radio broadcast.

Figure 5:
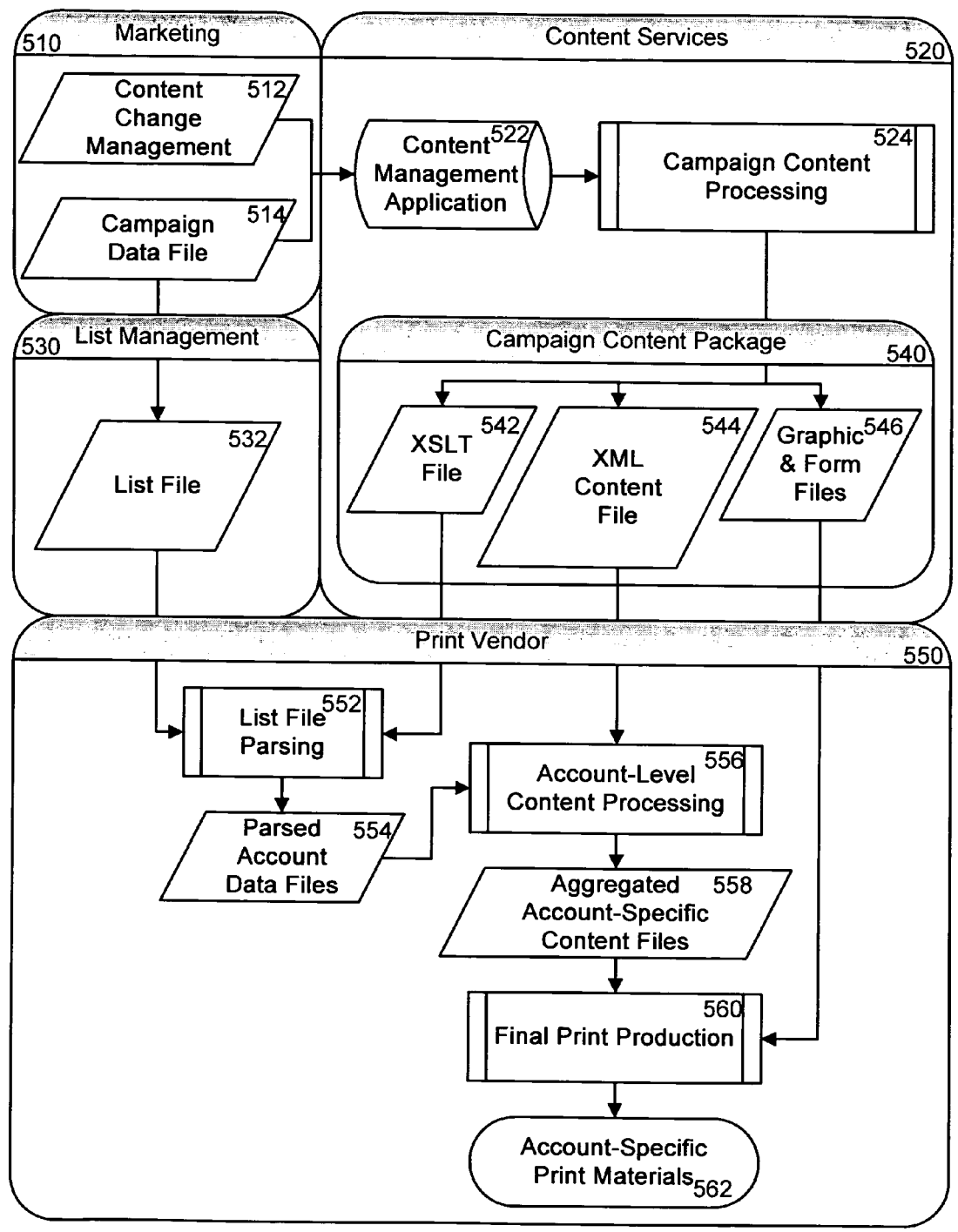
FIG. 5 is a flow chart illustrating an exemplary method for management and delivery of content and rules according to an embodiment of the present invention.

Referring now to FIG. 5, there is shown a flow chart illustrating an exemplary method for content management and delivery according to an embodiment of the present invention. The illustrated process steps are related to the production of convenience checks in a marketing campaign. Nevertheless, the exemplary method may be applicable or adaptable to the preparation of other types of client communications as well.

In a marketing campaign for credit products, marketing department 510 of a financial company may generate certain requirements for the campaign. For example, any required content changes may be submitted and processed through a content change management application 512. Specific information related to the campaign, such as balance transfer pricing structure and population targeting criteria, may be included in a campaign data file 514. The campaign data file 514 may be delivered to list management department 530, where the campaign data may be processed resulting in account/individual list file 532. The list file 532 may contain account data with placeholder tags for variable data and variable content. The campaign data file 514 may also be delivered to content services department 520 together with the content changes. A content management application 522 may integrate the campaign content and campaign data in step 524 and generate a campaign content package 540. The campaign content package 540 may include an XSLT File 542, an XML content file 544 and graphic and form files 546. The XSLT file 542 may be a logic file that is used to parse the list file 532. The XML content file 544 may contain all the campaign-related template, presentation and content information. The graphic and form files 546 may be images (e.g., background images of a convenience check or check template form) that are referenced in the XML Content File 544 and are to be placed in the final print. Next, the list file 532 and the campaign content package 540 may be delivered to a print vendor 550. In step 552, the print vendor 550 may run a program to parse the list file 532 based on the XSLT file 542, generating parsed account data files 554. In the parsed account data files 554, each account's data may be matched with qualified campaign data. Then, in step 556, account-level content processing may be performed, where information in the XML content file 544 may be executed against the parsed account data files 554, resulting in aggregated account-specific content files 558. The aggregated account-specific content files 558 may contain content, presentation instructions (e.g., content placement and style information), and image instructions (e.g., image reference, placement, and style information). In the final print production step 560, the aggregated account-specific content files 558 may be printed on pre-existing template forms based on the presentation instructions. Specific form IDs may be referenced in the aggregated account-specific content files 558. The referenced images may be retrieved from the graphic and form files 546 and printed on the forms based on the image instructions. The final result may be account-specific print materials 562 such as individualized convenience checks with recipients' names, mailing addresses and balance transfer interest rates.

According to embodiments of the invention, the system and method for management and delivery of content and rules as described above may be especially beneficial to a company with the need for mass distribution of content and/or data to a diverse population. Companies that may be benefited include those in the financial services sector, insurance, pharmaceutical, publishing, or manufacturing (such as tools, automobiles or electronics equipment) with the need to communicate to their customers or potential customer base. For example, a financial company may prepare and send million of direct-mail pieces on a weekly basis, distribute a wide range of acquisition materials such as magazine ads, take-ones, fast applications and mail inserts, contact millions of banking customers or card members at least on a monthly basis, and send out a huge amount of fulfillment materials, both printed and plastic. For such a financial entity, it may be desirable to implement the system and method for management and delivery of content and rules in accordance with embodiments of the present invention, such that the management of data, content and rules may be centralized and streamlined. As a result, business rules may be embedded to match content to data. For example, disclosure language may be consistently matched to pricing data, marketing copies may be accurately populated with offer data, and partner requirements may be fulfilled by correct use of images and language. The centralized content management may also ensure consistent and efficient change management where changes are not duplicated and relational changes may be systematically identified. Such implementation may also facilitate sharing of information among different lines of business within the company, which may create cross-sell opportunities otherwise invisible to independent-operating lines of business.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A computer-implemented method for management and delivery of content and rules, the method comprising:
    managing, for an organization, a plurality of data and a plurality of content in separate database entities, the managing accomplished using a computer processor, wherein the plurality of content is associated with the plurality of data based on a plurality of rules, the plurality of rules controlling a logical combination and physical layout of the plurality of data and plurality of content;
    packaging, using the computer processor, the plurality of rules with the plurality of content in a carrier that is independent from multiple presentation channels, wherein at least part of the plurality of content is integrated with at least part of the plurality of data;
    delivering the plurality of data and the carrier to the multiple presentation channels;
    integrating, using processing tools at the multiple presentation channels, the plurality of data with the plurality of content based on the plurality of rules in order to logically integrate the data and content and control the physical layout of the integrated data and content; and
    distributing the integrated data and content through the multiple presentation channels.

2. The method according to claim 1, wherein the plurality of data is associated with a plurality of products and a plurality of clients.

3. The method according to claim 1, wherein the plurality of data and the plurality of content are associated with financial products.

4. The method according to claim 1, wherein the carrier comprises a plurality of style tags, wherein the plurality of style tags are associated with the plurality of content based on the plurality of rules.

5. The method according to claim 1, wherein the plurality of content comprises at least one of:
    a discrete text element;
    a compiled text element; and
    a graphic element.

6. The method according to claim 1, wherein the plurality of content is stored in at least one media-independent format.

7. The method according to claim 1, wherein the plurality of content is packaged based on an extensible markup language (XML).

8. The method according to claim 1, wherein the plurality of rules are packaged based on an XSL transformations (XSLT) language.

9. The method according to claim 1, wherein the integration of the plurality of data with the plurality of content is further based on specific needs of the multiple presentation channels.

10. The method according to claim 1 further comprising sharing the plurality of data and the plurality of content among a plurality of lines of business.

11. The method according to claim 1 further comprising editing the plurality of content and the plurality of business rules via a user interface.

12. The method according to claim 1 further comprising previewing at least one combination of the plurality of data and the plurality of content for legal compliance.

13. The method according to claim 1 further comprising auditing the integrated data and content prior to the step of distributing.

14. The method according to claim 1 further comprising automatically generating at least one layout file for distribution.

15. The method according to claim 1, wherein the multiple presentation channels comprise at least one of:
    an Internet website;
    a printed communication;
    an electronic communication;
    a printed advertisement;

a broadcast advertisement;
a telemarketing script;
an interactive voice response unit message;
an automatic teller machine (ATM) message; and
a display-board message.

16. A system for management and delivery of content and rules, the system comprising:
   at least one first database entity that manages a plurality of data;
   at least one second database entity that manages a plurality of content, wherein the plurality of content is associated with the plurality of data based on a plurality of rules, the plurality of rules controlling a logical combination and physical layout of the plurality of data and plurality of content;
   a processor module;
   a delivery module; and
   multiple presentation channels;
   where
      the processor module packages the plurality of rules with the plurality of content in a carrier that is independent from the multiple presentation channels, wherein at least part of the plurality of content is integrated with at least part of the plurality of data,
      the delivery module delivers the plurality of data and the carrier to the multiple presentation channels, and
      the multiple presentation channels integrate the plurality of data with the plurality of content based on the plurality of rules in order to logically integrate the data and content and control the physical layout of the integrated data and content, and distribute the integrated data and content.

17. The system according to claim 16, wherein the plurality of data is associated with a plurality of products and a plurality of clients.

18. The system according to claim 16, wherein the plurality of data and the plurality of content are associated with financial products.

19. The system according to claim 16, wherein the carrier comprises a plurality of style tags, wherein the plurality of style tags are associated with the plurality of content based on the plurality of rules.

20. The system according to claim 16, wherein the plurality of content comprises at least one of:
   a discrete text element;
   a compiled text element; and
   a graphic element.

21. The system according to claim 16, wherein the plurality of content is stored in at least one media-independent format.

22. The system according to claim 16, wherein the plurality of content is packaged based on an extensible markup language (XML).

23. The system according to claim 16, wherein the plurality of rules are packaged based on an XSL transformations (XSLT) language.

24. The system according to claim 16, wherein the integration of the plurality of data with the plurality of content is further based on specific needs of the multiple presentation channels.

25. The system according to claim 16 further comprising a sharing module that shares the plurality of data and the plurality of content among a plurality of lines of business.

26. The system according to claim 16 further comprising a change management interface for editing the plurality of content and the plurality of business rules.

27. The system according to claim 16 further comprising a preview interface for previewing at least one combination of the plurality of data and the plurality of content for legal compliance.

28. The system according to claim 16 further comprising an auditing interface for auditing the integrated data and content prior to the step of distributing.

29. The system according to claim 16 further comprising a generation module that automatically generates at least one layout file for distribution.

30. The system according to claim 16, wherein the multiple presentation channels comprise at least one of:
   an Internet website;
   a printed communication;
   an electronic communication;
   a printed advertisement;
   a broadcast advertisement;
   a telemarketing script;
   an interactive voice response unit message;
   an automatic teller machine (ATM) message; and
   a display-board message.

31. A system for management and delivery of content and rules, the system comprising:
   means for managing, for an organization, a plurality of data and a plurality of content in separate database entities, wherein the plurality of content is associated with the plurality of data based on a plurality of rules, the plurality of rules controlling a logical combination and physical layout of the plurality of data and plurality of content;
   means for packaging the plurality of rules with the plurality of content in a carrier that is independent from multiple presentation channels, wherein at least part of the plurality of content is integrated with at least part of the plurality of data;
   means for delivering the plurality of data and the carrier to the multiple presentation channels;
   means for integrating, at the multiple presentation channels, the plurality of data with the plurality of content based on the plurality of rules in order to logically integrate the data and content and control the physical layout of the integrated data and content; and
   means for distributing the integrated data and content through the multiple presentation channels.

32. A computer readable medium having code for causing at least one processor to manage and deliver content and rules, the computer readable medium comprising:
   code adapted to manage, for an organization, a plurality of data and a plurality of content in separate database entities, wherein the plurality of content is associated with the plurality of data based on a plurality of rules, the plurality of rules controlling a logical combination and physical layout of the plurality of data and plurality of content;
   code adapted to package the plurality of rules with the plurality of content in a carrier that is independent from multiple presentation channels, wherein at least part of the plurality of content is integrated with at least part of the plurality of data;
   code adapted to deliver the plurality of data and the carrier to the multiple presentation channels;
   code adapted to integrate, at the multiple presentation channels, the plurality of data with the plurality of content based on the plurality of rules in order to logically integrate the data and content and control the physical layout of the integrated data and content; and
   code adapted to distribute the integrated data and content through the multiple presentation channels.

33. A method for management and delivery of content and rules, the method comprising:

managing, for an organization, a plurality of data and a plurality of content in separate database entities, the managing accomplished using a computer processor, wherein the plurality of data are associated with a plurality of products and a plurality of clients, the plurality of content is stored in at least one media-independent format and comprises at least one of a discrete text element, a compiled text element and a graphic element, and the plurality of content is associated with the plurality of data based on a plurality of rules;

packaging, using the computer processor, the plurality of rules with the plurality of content in a carrier that is independent from multiple presentation channels, wherein at least part of the plurality of content is integrated with at least part of the plurality of data, the plurality of content is packaged based on an extensible markup language (XML), and the plurality of rules are packaged based on an XSL transformations (XSLT) language;

delivering the plurality of data and the carrier to the multiple presentation channels, wherein the multiple presentation channels comprise at least one of an Internet website, a printed communication, an electronic communication, a printed advertisement, a broadcast advertisement, a telemarketing script, an interactive voice response unit message, an automatic teller machine (ATM) message, and a display-board message;

integrating, using computer processing tools at the multiple presentation channels, the plurality of data with the plurality of content based on the plurality of rules and specific needs of the multiple presentation channels; and distributing the integrated data and content through the multiple presentation channels.

* * * * *